(12) United States Patent
McCulloch et al.

(10) Patent No.: US 7,293,752 B2
(45) Date of Patent: Nov. 13, 2007

(54) POSITIVE ENGAGEMENT LATCH FOR A VEHICLE SEAT

(75) Inventors: Peter R. McCulloch, Grosse Pointe Woods, MI (US); Joseph J. Grajewski, Jackson, MI (US)

(73) Assignee: Lear Corporation, Southfield, MI (US)

( * ) Notice: Subject to any disclaimer, the term of this patent is extended or adjusted under 35 U.S.C. 154(b) by 299 days.

(21) Appl. No.: 10/904,201

(22) Filed: Oct. 28, 2004

(65) Prior Publication Data
US 2006/0091278 A1 May 4, 2006

(51) Int. Cl.
*F16M 13/00* (2006.01)

(52) U.S. Cl. ............... 248/429; 248/424; 248/430; 297/311; 297/312

(58) Field of Classification Search ............... 248/429, 248/424, 430; 297/346, 344, 341, 344.1, 297/311, 312
See application file for complete search history.

(56) References Cited

U.S. PATENT DOCUMENTS

| | | | |
|---|---|---|---|
| 4,961,559 A * | 10/1990 | Raymor | ........ 248/429 |
| 5,242,144 A | 9/1993 | Williams et al. | |
| 5,806,825 A | 9/1998 | Couasnon | |
| 5,961,088 A | 10/1999 | Chabanne | |
| 6,086,154 A | 7/2000 | Mathey et al. | |
| 6,161,892 A | 12/2000 | Chabanne et al. | |
| 6,354,553 B1 | 3/2002 | Lagerweij et al. | |
| 6,488,457 B2 | 12/2002 | Diamante | |
| 6,513,868 B1 | 2/2003 | Tame | |
| 6,601,920 B1 | 8/2003 | Magyar | |
| 6,761,407 B1 | 7/2004 | Goodbred | |
| 6,892,995 B2 * | 5/2005 | Tame et al. | ........ 248/429 |
| 2002/0079418 A1 | 6/2002 | Tame et al. | |
| 2004/0090101 A1 | 5/2004 | Andersson et al. | |

FOREIGN PATENT DOCUMENTS

| | | |
|---|---|---|
| DE | 38 22 452 A1 | 1/1990 |
| DE | 43 37 293 C1 | 12/1994 |
| DE | 43 21 720 A1 | 1/1995 |
| DE | 44 03 310 C2 | 8/1995 |
| EP | 0 891 888 B1 | 1/1999 |
| EP | 0943484 A2 | 9/1999 |
| JP | 2005041292 | 2/2005 |

* cited by examiner

*Primary Examiner*—Amy J. Sterling
(74) *Attorney, Agent, or Firm*—Brooks Kushman P.C.

(57) ABSTRACT

A seat track assembly for adjusting a seat assembly of a vehicle includes a first track and a second track that is moveable with respect to the first track. The seat track assembly further includes a latch mechanism associated with the second track, and the latch mechanism is operative to inhibit relative movement of the tracks. The latch mechanism includes multiple triggers that are each pivotable between a locked position in which the trigger is engaged with the first track, and an unlocked position in which the trigger is disengaged from the first track.

20 Claims, 4 Drawing Sheets

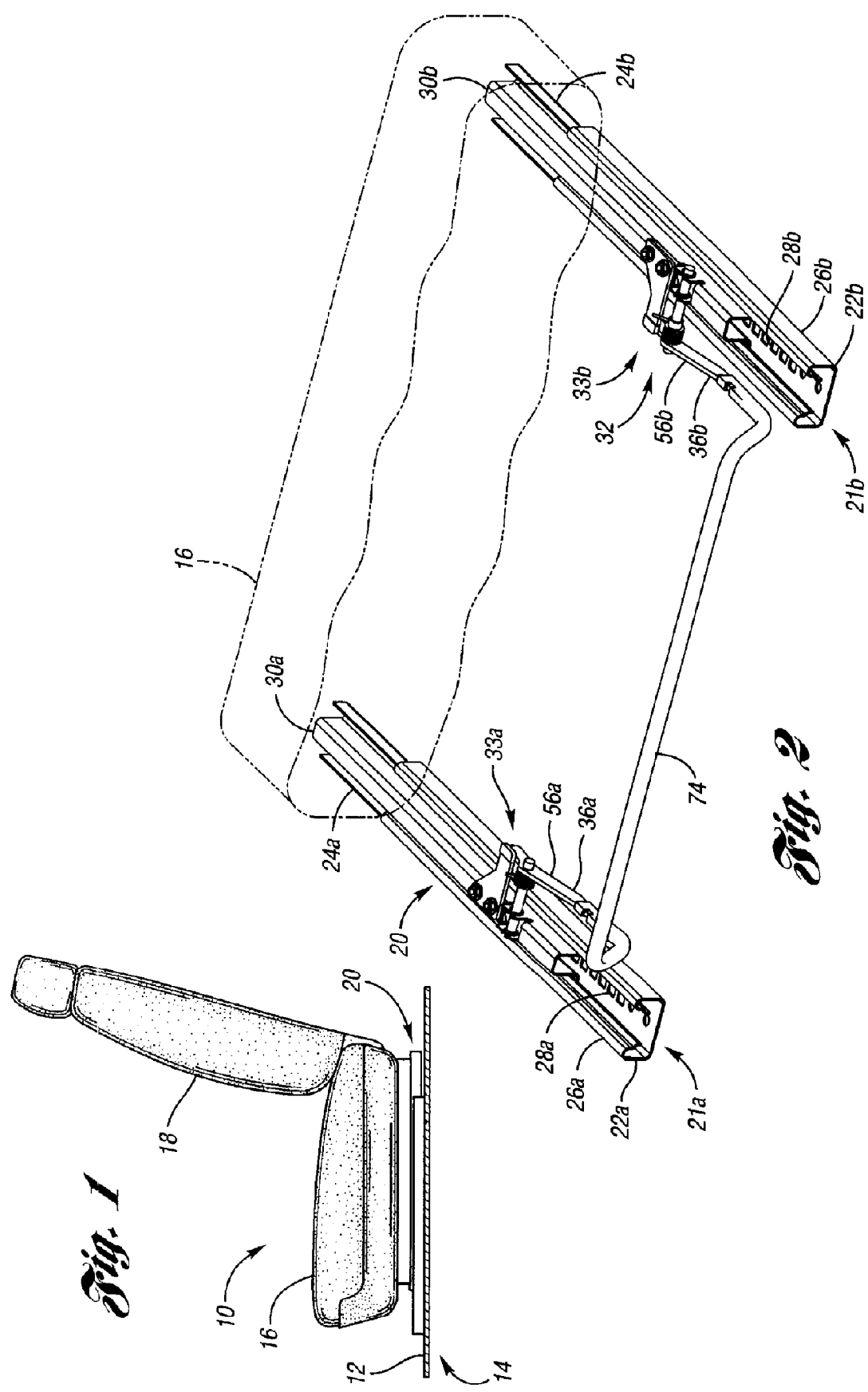

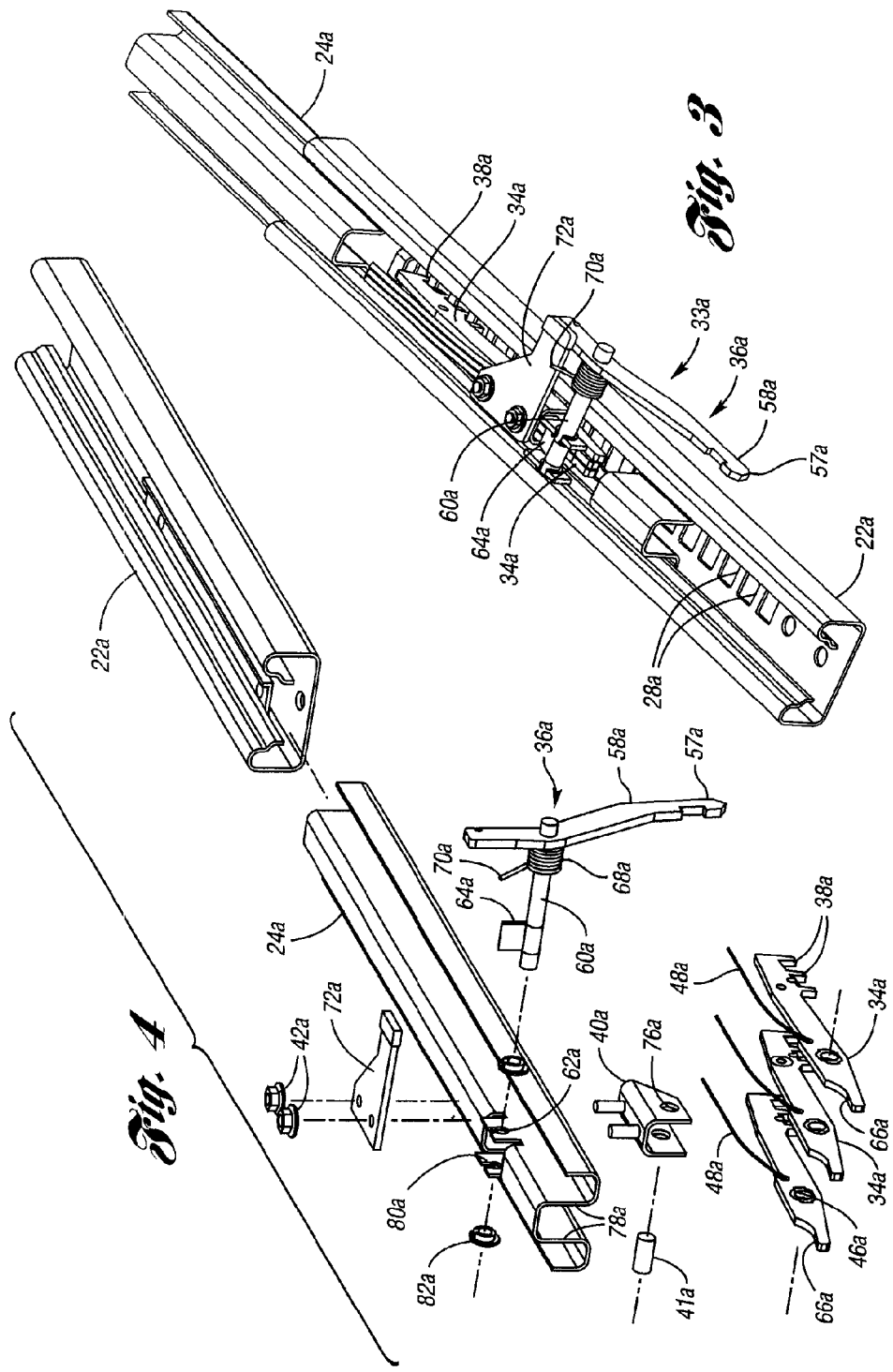

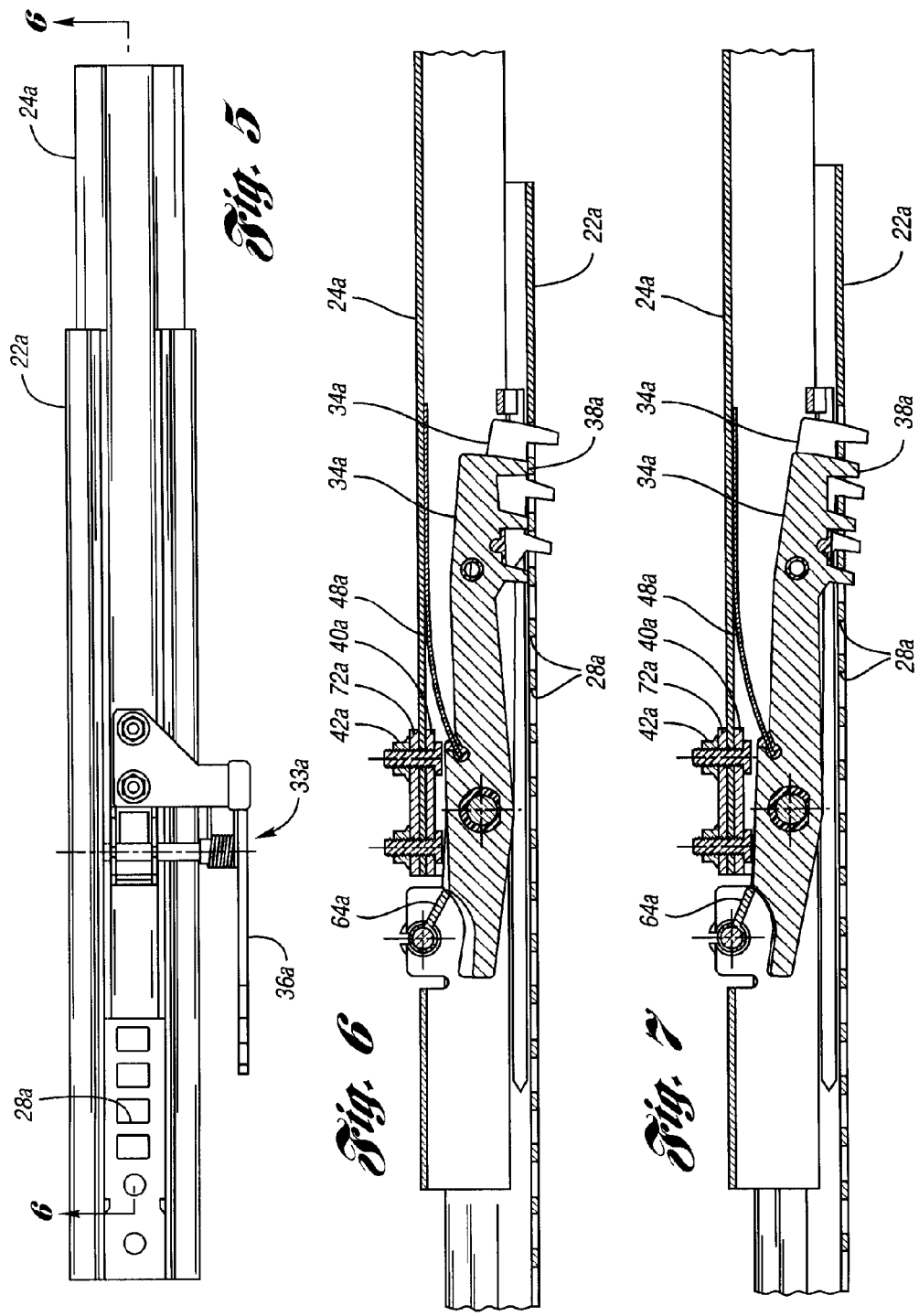

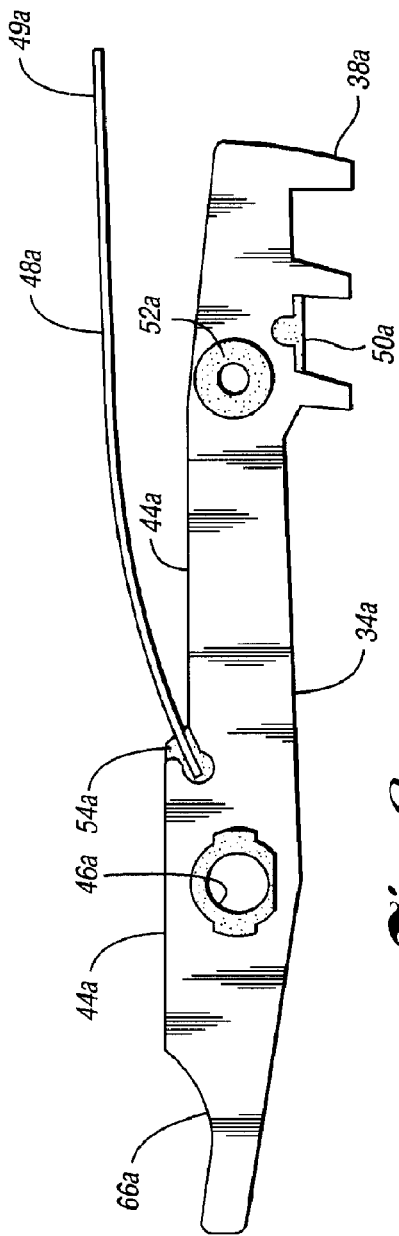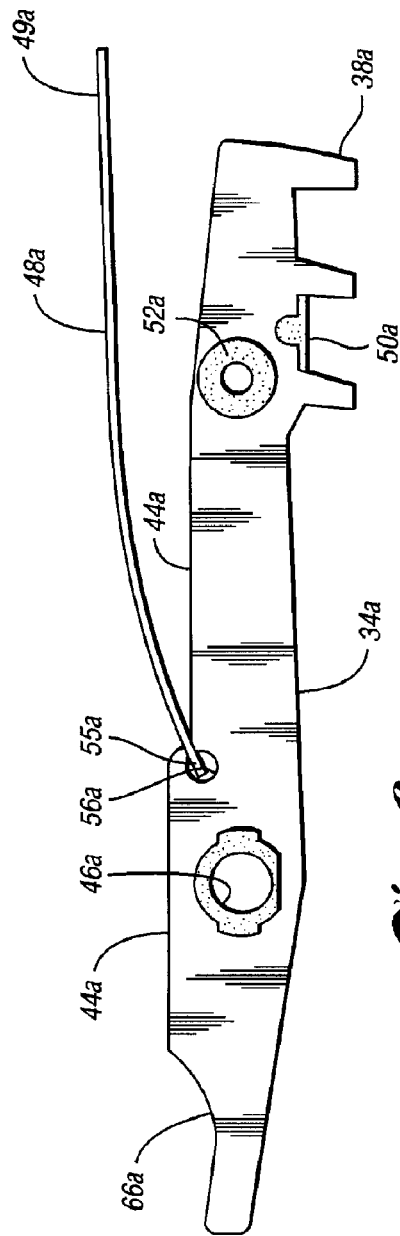

POSITIVE ENGAGEMENT LATCH FOR A VEHICLE SEAT

BACKGROUND OF THE INVENTION

1. Field of the Invention

The invention relates to a vehicle seat track assembly having a positive engagement latch.

2. Background Art

A vehicle seat track assembly is typically operative to allow forward and reward movement of an associated vehicle seat. Such a seat track assembly may include upper and lower tracks and a positive engagement latch for preventing relative movement of the tracks. An example of a positive engagement latch is disclosed in U.S. patent application Ser. No. 09/995,241, which was published as Publication No. U.S. 2002/0079418 A1.

SUMMARY OF THE INVENTION

Under the invention, a seat track assembly for adjusting a seat assembly of a vehicle is provided. The seat track assembly includes a first track and a second track that is moveable with respect to the first track. The seat track assembly further includes a latch mechanism associated with the second track, and the latch mechanism is operative to inhibit relative movement of the tracks. The latch mechanism includes multiple triggers that are each pivotable between a locked position in which the trigger is engaged with the first track, and an unlocked position in which the trigger is disengaged from the first track.

Further under the invention, a seat track assembly for adjusting a seat assembly of a vehicle includes a first track and a second track that is moveable with respect to the first track. The seat track assembly further includes a latch mechanism associated with the second track and being operative to inhibit relative movement of the tracks. The latch mechanism includes a trigger that is moveable between a locked position in which the trigger is engaged with the first track, and an unlocked position in which the trigger is disengaged from the first track. Furthermore, the trigger includes a bumper that is engageable with the first track when the trigger moves toward the locked position to reduce noise resulting from engagement between the trigger and the first track.

Still further under the invention, a seat track assembly for adjusting a seat assembly of a vehicle includes a first track, a second track that is moveable with respect to the first track, and a latch mechanism associated with the second track and being operative to inhibit relative movement of the tracks. The latch mechanism includes a trigger that is moveable between a locked position in which the trigger is engaged with the first track, and an unlocked position in which the trigger is disengaged from the first track. The latch mechanism further includes a spring insert molded with the trigger, and the spring is configured to urge the trigger toward the locked position.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a side view of a seat assembly according to the invention including a seat track assembly;

FIG. 2 is a perspective view of the seat track assembly showing two track arrangements and a latch assembly associated with the track arrangements, wherein each track arrangement includes a lower track and an upper track slidably mounted on the lower track;

FIG. 3 is a fragmentary perspective view of one side of the seat track assembly, with a portion of the associated upper track cut away to show a latch mechanism of the latch assembly;

FIG. 4 is an exploded perspective view of the latch mechanism of FIG. 3;

FIG. 5 is a top view of the latch mechanism and associated track arrangement;

FIG. 6 is a cross-sectional view of the latch mechanism and track arrangement of FIG. 5 showing one trigger of the latch mechanism engaged with a lower track of the track arrangement;

FIG. 7 is a cross-sectional view similar to FIG. 5 showing two triggers of the latch mechanism engaged with the lower track of the track arrangement;

FIG. 8 is a side view of one of the triggers of FIG. 7; and

FIG. 9 is a fragmentary view of a trigger showing an alternative manner for attaching a spring to a main body of the trigger.

DETAILED DESCRIPTION OF THE PREFERRED EMBODIMENT(S)

FIG. 1 shows a vehicle seat assembly 10 mounted to a floor 12 of a motor vehicle 14. The seat assembly 10 includes a seat bottom 16, a seat back 18 pivotally connected to the seat bottom 16, and a seat track assembly 20 according to the invention for allowing forward and rearward movement of the seat bottom 16 and seat back 18.

Referring to FIG. 2, the seat track assembly 20 includes two track arrangements 21a-b that are each disposed proximate a side of the seat bottom 16. The track arrangement 21a includes first and second tracks, such as a lower and upper tracks 22a and 24a, respectively, that are configured to allow relative movement of one track 22a, 24a with respect to the other track 22a, 24a. Similarly, the track arrangement 21b includes first and second tracks, such as a lower and upper tracks 22b and 24b, respectively, that are configured to allow relative movement of one track 22b, 24b with respect to the other track 22b, 24b. In the embodiment shown in FIG. 2, for example, each lower track 22a,b is configured to be fixedly attached to the vehicle floor 12, and each upper track 24a,b is slidably mounted on a respective lower track 22a,b. The upper tracks 24a-b are also attached to the seat bottom 16 such that the upper tracks 24a-b and seat bottom 16 are moveable forward and rearward along the lower tracks 22a-b.

While the tracks 22a-b and 24a-b may have any suitable configuration, in the embodiment shown in the Figures, each lower track 22a,b has a generally U-shaped body 26a,b having multiple spaced apart apertures 28a,b. Each upper track 24a,b has an inverted generally U-shaped body 30a,b that is slidably received in a respective lower track 22a,b.

The seat track assembly 20 further includes a positive engagement latch assembly 32 that is moveable between a locked position for inhibiting relative movement of the tracks 22a-b and 24a-b, and an unlocked position for allowing movement of the upper tracks 24a-b with respect to the lower tracks 22a-b. In the embodiment shown in FIG. 2, the latch assembly 32 includes two latch mechanisms 33a-b that are each operative to inhibit movement of a particular upper track 24a,b with respect to a particular lower track 22a,b.

Referring to FIGS. 3-8, a detailed description of the latch mechanism 33a will now be provided, with the understanding that the other latch mechanism 33b may have the same or similar construction. The latch mechanism 33a shown in FIG. 3 includes one or more engaging members or triggers 34a that are moveably attached to the upper track 24a and selectively engageable with the lower track 22a, and an actuator 36a for moving the triggers 34a. In the embodiment shown in FIGS. 3 and 4, the latch mechanism 33a includes three triggers 34a that each have multiple teeth 38a for engaging the apertures 28a of the lower track 22a. The triggers 34a are also pivotally mounted to a generally U-shaped bracket 40a, such as with a pivot pin 41a, and the bracket 40a is fixedly attached to the upper track 24a such as with fasteners 42a.

Each trigger 34a is pivotable between a locked position in which one or more teeth 38a are engaged with the lower track 22a and extend into one or more apertures 28a, and an unlocked position in which the teeth 38a are disengaged from the lower track 22a. Referring to FIG. 6, one trigger 34a is shown raised in the unlocked position, and another trigger 34a is shown lowered in the locked position (the third trigger 34a is not visible in FIG. 6). As shown in FIGS. 3 and 7, the triggers 34a are staggered such that more than one trigger 34a may extend into a particular aperture 28a to provide a "wedged" engagement between the latch mechanism 33a and the lower track 22a. For example, the triggers 34a may have different lengths with different positioning of respective teeth 38a, such that one tooth 38a from each of two triggers 34a engages a particular aperture 28a simultaneously. This wedged engagement substantially reduces or eliminates relative movement of the tracks 22a and 24a when the latch assembly 32 is in the locked position. Furthermore, the triggers 34a and lower track 22a may be configured to provide a wedged engagement at any suitable travel distance of the seat bottom 16, such as 5 millimeters or less.

Referring to FIG. 8, each trigger 34a includes a trigger main body 44a and a bushing 46a that is attached to the main body 44a for rotatably engaging the pivot pin 41a. Each bushing 46a also projects laterally outwardly from one or both sides of a respective trigger main body 44a, and is engageable with a trigger main body 44a and/or bushing 46a of an adjacent trigger 34a so as to space adjacent trigger main bodies 44a apart.

Each trigger 34a further includes a spring 48a that is attached to the trigger main body 44a and that is engageable with the upper track 24a for urging the trigger 34a toward the locked position. Each spring 48a is formed as longitudinally extending member that is generally coplanar with the associated trigger 34a. Furthermore, each spring 48a has a free end portion 49a that is engageable with an inner surface of the upper track 24a when the triggers 34a are mounted between the tracks 22a and 24a.

Each trigger 34a may also include a bumper 50a and/or a spacer 52a that are each attached to the trigger main body 44a. Each bumper 50a is engageable with the lower track 22a when the associated trigger 34a moves toward the locked position, and the bumpers 50a are configured to cushion engagement of the triggers 34a with the lower track 22a to reduce noise resulting from such engagement.

Each spacer 52a projects laterally outwardly from a respective trigger main body 44a, and is engageable with a trigger main body 44a and/or spacer 52a of an adjacent trigger 34a so as to space adjacent trigger main bodies 44a apart. With such a configuration, the spacers 52a, as well as the bushings 46a, facilitate free movement and proper alignment of the triggers 34a. In one embodiment of the invention in which the latch mechanism 33a has three triggers 34a, the middle trigger 34a is provided with a spacer 52a that extends laterally outwardly from each side of the trigger main body 44a so that the spacer 52a engages the other two triggers 34a.

While each trigger 34a may be made of any suitable material, in one embodiment of the invention, each trigger main body 44a comprises a first material, and each bushing 46a, bumper 50a and spacer 52a comprises a second material different than the first material. For example, each trigger main body 44a may be made of metal, such as steel, and each bushing 46a, bumper 50a and spacer 52a may be made of plastic.

Furthermore, each trigger 34a may be made in any suitable manner. For example, each trigger main body 44a may be stamped from sheet metal, and each bushing 46a, bumper 50a and spacer 52a, as well as a spring attachment member 54a for attaching spring 48a, may be molded onto a respective trigger main body 44a. More specifically, each trigger 34a may be made formed in part by an insert molding process in which a stamped trigger main body 44a is positioned in a mold along with a spring 48a, and plastic material is injected into the mold to form the bushing 46a, bumper 50a, spacer 52a, and spring attachment member 54a. One or more of the components 46a, 50a, 52a and 54a may also be formed as a single piece. For example, the bushing 46a and spring attachment member 54a of a particular trigger 34a may be formed as a single piece.

Alternatively, each spring 48a may be mechanically attached to a respective trigger main body 44a. For example, referring to FIG. 9, a particular spring 48a may be provided with a bent end 55a that is insertable into a notch 56a in a respective trigger main body 44a. The trigger main body 44a may then be crimped or otherwise pressed together to trap the spring end 55a in the notch 56a.

Referring to FIGS. 2 and 3, each actuator 36a,b is operative to move the triggers 34a,b of a respective latch mechanism 33a,b from the locked positions to the unlocked positions so that each upper track 24a,b may be moved with respect to each lower track 22a,b. Referring to FIGS. 3 and 4, a detailed description of the actuator 36a of the latch mechanism 33a will now be provided, with the understanding that the other actuator 36b may have the same or similar construction. The actuator 36a shown in FIGS. 3 and 4 includes an actuator lever 57a having a main portion 58a and a rod portion 60a extending from the main portion 58a. The rod portion 60a is configured to extend into one or more apertures 62a formed in the upper track 24a such that the actuator lever 57a is rotatable with respect to the upper track 24a between a first or locking position and a second or unlocking position. The rod portion 60a also includes an engaging portion, such as a paddle 64a, for engaging an actuator engaging portion 66a of each trigger 34a. When the actuator lever 57a is moved from the first position to the second position, the paddle 64a engages the actuator engaging portions 66a of the triggers 34a and moves the triggers 34a to the unlocked positions.

The paddle 64a may be made of a plastic material, or other suitable material, to provide smooth, reduced-noise engagement with the triggers 34a. For example, the paddle 64a may be formed of polypropylene that is injection molded onto the rod portion 60a, which may be made of metal.

Still referring to FIGS. 3 and 4, the actuator 36a also includes a spring 68a for urging the actuator lever 57a toward the first position. In the embodiment shown in FIG.

3, the spring 68a has a first end engaged with the main portion 58a of the actuator lever 57a, and a second end 70a engaged with a plate 72a mounted on the upper track 24a.

Referring to FIG. 2, the actuator levers 57a-b may be connected together by a grab handle 74. The grab handle 74 may be grasped by a seat occupant and pulled upwardly so as to move each actuator lever 57a,b to the respective second position. As a result, all triggers 34a-b may be moved to the unlocked positions simultaneously so that the seat bottom 16 may moved to a desired position. Upon reaching the desired position, the grab handle 74 may be lowered so that one or more triggers 34a,b of each latch mechanism 33a,b engage a respective lower track 22a,b to lock the seat bottom 16 in the desired position.

Advantageously, the triggers 34a-b may be configured to allow continued movement of the grab handle 74 and actuator levers 57a-b after the triggers 34a-b have reached the unlocked positions. Referring to FIG. 8, for example, the actuator engaging portion 66a,b of each trigger 34a,b may be formed as a continuous smooth surface that does not include a stop. With such a configuration, high impact loads between the actuator levers 57a-b and triggers 34a-b are avoided.

Furthermore, the seat track assembly 20 may be configured such that at least one trigger 34a,b of each latch mechanism 33a,b will always engage a respective lower track 22a,b when the latch assembly 20 is moved to the locked position, no matter what relative position the upper tracks 24a-b have with respect to the lower tracks 22a-b. Preferably, at least two triggers 34a,b of each latch mechanism 33a,b engage a respective lower track 22a,b to provide a wedged engagement when the latch assembly 20 is moved to the locked position. Depending on such factors as the size and spacing of the trigger teeth 38a,b and apertures 28a,b, however, slight movement of the upper tracks 24a-b relative to the lower tracks 22a-b may be needed for a second trigger 34a,b of each latch mechanism 33a,b to move to its locked position after a first trigger 34a,b of each latch mechanism 33a,b has moved to its locked position.

Referring to FIGS. 3 and 4, an example assembly procedure for the latch mechanism 33a will now be described in detail. First, the triggers 34a may be inserted into the bracket 40a, and the pivot pin 41a may then be inserted through apertures 76a formed in bracket 40a, as well as through the bushings 46a of the triggers 34a. Next, the bracket 40a may be attached to the upper track 24a using plate 72a and fasteners 42a, such that the pivot pin 41 is trapped between side walls 78a of the upper track 24a. The rod portion 60a of the actuator lever 57a is then inserted into the apertures 62a such that the paddle 64a passes through slot portion 80a of one the apertures 62a. Next, the actuator lever 57a is rotated to trap the paddle 64a between sidewalls 78a of the upper track 24a, and to engage the second end 70a of the spring 68a with the plate 72a. Bushings 82a may also be inserted into the apertures 62a to facilitate rotation of the actuator lever 57a. Next, the upper track 24a may be slidably mounted onto the lower track 22a such that the triggers 34a and springs 48a are disposed between the tracks 22a and 24a.

The latch mechanism 33b may be assembled in a similar manner as described above with respect to the latch mechanism 33a. Next, the upper tracks 22a-b may be assembled to the seat bottom 16, and the grab bar 74 may be attached to each actuator lever 56a,b.

The seat track assembly 20 of the invention may provide numerous advantages over other known assemblies. First, for example, the latch mechanisms 33 may be quickly and easily assembled as described above in detail. Second, the configuration of the springs 48 described above enables compact packaging of the triggers 34 between the tracks 22 and 24. Third, the triggers 34 may be provided with bushings 46 and/or spacers 52 to enable smooth operation and desired spacing of the triggers 34. Fourth, the triggers 34 may be provided with bumpers 50 to reduce noise of operation. Fifth, the triggers 34 may be configured to allow over travel of the grab handle 74 and actuator levers 56, thus avoiding hard contact between the triggers 34 and the actuator levers 56. In addition, the triggers 34 may be assembled with a staggered configuration that provides numerous wedged, locked positions between the upper tracks 24 and the lower tracks 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat track assembly for adjusting a seat assembly of a vehicle, the seat track assembly comprising:
   a first track;
   a second track that is moveable with respect to the first track; and
   a latch mechanism associated with the second track and being operative to inhibit relative movement of the tracks, the latch mechanism including multiple triggers that are each pivotable between a locked position in which the trigger is engaged with the first track, and an unlocked position in which the trigger is disengaged from the first track;
   wherein each trigger includes a bumper that is engageable with the first track when the trigger moves toward the locked position to reduce noise resulting from engagement between the trigger and the first track.

2. The seat track assembly of claim 1 wherein the triggers are disposed between the first and second tracks.

3. The seat track assembly of claim 1 wherein the latch mechanism further includes multiple springs, each spring being engaged with a respective trigger for urging the trigger toward the locked position.

4. The seat track assembly of claim 3 wherein each spring comprises a longitudinally extending member that is generally coplanar with the associated trigger.

5. The seat track assembly of claim 1 wherein the latch mechanism includes an actuator for moving the triggers toward the unlocked positions, each trigger being configured to allow continued movement of the actuator after the trigger has reached the unlocked position.

6. The seat track assembly of claim 1 wherein the latch mechanism includes a bracket to which the triggers are pivotably mounted, the bracket being attached to the second track such that the bracket is disposed between the tracks.

7. The seat track assembly of claim 1 wherein the multiple triggers include first, second and third triggers, the second trigger being disposed between the first and third triggers, the second trigger including a main body and a spacer configured to space the main body away from the first and third triggers, the main body comprising a first material, and the spacer comprising a second material that is different than the first material.

8. The seat track assembly of claim 1 wherein the first track includes multiple spaced apart apertures, and each trigger includes multiple teeth that each extend into one of the apertures when the trigger is in the locked position, the teeth of adjacent triggers being staggered such that a tooth of each of two triggers extends into the same aperture when the two triggers are each in the locked position.

9. A seat track assembly for adjusting a seat assembly of a vehicle, the seat track assembly comprising:
- a first track;
- a second track that is moveable with respect to the first track; and
- a latch mechanism associated with the second track and being operative to inhibit relative movement of the tracks, the latch mechanism including a trigger that is moveable between a locked position in which the trigger is engaged with the first track, and an unlocked position in which the trigger is disengaged from the first track, the trigger including a bumper that is engageable with the first track when the trigger moves toward the locked position to reduce noise resulting from engagement between the trigger and the first track.

10. The seat track assembly of claim 9 wherein the first track includes multiple spaced apart apertures, the trigger includes a main body having multiple teeth that each extend into an aperture when the trigger is in the locked position, and the bumper is disposed between adjacent teeth.

11. The seat track assembly of claim 10 wherein the main body comprises a first material, and the bumper comprises a second material that is different than the first material.

12. The seat track assembly of claim 10 wherein the main body comprises metal, and the bumper comprises plastic that is molded onto the main body.

13. The seat track assembly of claim 9 wherein the latch mechanism includes a longitudinally extending spring that is engaged with the trigger for urging the trigger toward the locked position.

14. The seat track assembly of claim 13 wherein the trigger includes a longitudinally extending main body having multiple teeth, and the spring is generally coplanar with the main body.

15. The seat track assembly of claim 9 wherein the latch mechanism includes an actuator for moving the trigger toward the unlocked position, the trigger being configured to allow continued movement of the actuator after the trigger has reached the unlocked position.

16. A vehicle seat assembly comprising:
- a seat bottom; and
- a seat track assembly disposed proximate the seat bottom for adjusting the seat bottom, the seat track assembly including first and second tracks, one of the tracks being moveable with respect to the other track, the seat track assembly further including a latch mechanism associated with the second track and being operative to inhibit relative movement of the tracks, the latch mechanism including a trigger that is moveable between a locked position in which the trigger is engaged with the first track, and an unlocked position in which the trigger is disengaged from the first track, the trigger including a bumper that is engageable with the first track when the trigger moves toward the locked position to reduce noise resulting from engagement between the trigger and the first track.

17. The seat assembly of claim 16 wherein the latch mechanism further includes a spring insert molded with the trigger, the spring being configured to urge the trigger toward the locked position.

18. The seat assembly of claim 16 wherein the first track is adapted to be fixedly mounted to a vehicle floor, the second track is connected to the seat bottom, and the second track is moveable with respect to the first track.

19. The seat assembly of claim 16 wherein the first track includes multiple spaced apart apertures, the trigger includes a main body having multiple teeth that each extend into an aperture when the trigger is in the locked position, and the bumper is disposed between adjacent teeth.

20. The seat assembly of claim 19 wherein the main body comprises a first material, and the bumper comprises a second material that is different than the first material.

* * * * *